(12) United States Patent
Dearborn et al.

(10) Patent No.: US 8,489,291 B2
(45) Date of Patent: Jul. 16, 2013

(54) SYSTEM AND METHOD FOR COLLECTING SOIL SAMPLES

(75) Inventors: Jeffrey Allen Dearborn, Southaven, MS (US); Aaron Dale Hunt, Bellefonte, PA (US)

(73) Assignee: Hemisphere GPS LLC, Hiawatha, KS (US)

( * ) Notice: Subject to any disclaimer, the term of this patent is extended or adjusted under 35 U.S.C. 154(b) by 92 days.

(21) Appl. No.: 13/180,120

(22) Filed: Jul. 11, 2011

(65) Prior Publication Data

US 2012/0010788 A1    Jan. 12, 2012

Related U.S. Application Data

(60) Provisional application No. 61/363,416, filed on Jul. 12, 2010.

(51) Int. Cl.
*G06G 7/78* (2006.01)

(52) U.S. Cl.
USPC .................................. 701/50; 701/23; 701/28

(58) Field of Classification Search
USPC .... 701/50, 400, 467–470, 23–26, 28; 703/13; 705/7.11
See application file for complete search history.

(56) References Cited

U.S. PATENT DOCUMENTS

| | | | |
|---|---|---|---|
| 5,467,271 A | 11/1995 | Abel et al. | |
| 6,029,106 A | 2/2000 | Hale et al. | |
| 6,044,324 A | 3/2000 | Boerhave et al. | |
| 7,255,016 B2 | 8/2007 | Burton | |
| 7,552,654 B2 | 6/2009 | Burton | |
| 2001/0048755 A1 | 12/2001 | Wiens | |
| 2003/0125877 A1 | 7/2003 | Hanson | |
| 2005/0075784 A1 | 4/2005 | Gray et al. | |
| 2006/0074560 A1 | 4/2006 | Dyer et al. | |
| 2009/0112475 A1 | 4/2009 | Christy et al. | |
| 2010/0037712 A1 | 2/2010 | Burton | |
| 2011/0314938 A1 | 12/2011 | Anderson | |
| 2012/0101634 A1* | 4/2012 | Lindores | 700/266 |
| 2012/0101861 A1* | 4/2012 | Lindores | 705/7.11 |
| 2012/0109614 A1* | 5/2012 | Lindores | 703/11 |

OTHER PUBLICATIONS

Paul Schrimpf, Jimmy Sanders: Technology in Overdrive, HTTP://www.croplife.com/article/1606, May 7, 2009, 3 pages.
Eric Sfiligoj, Jimmy Sanders: Tracking Assets, HTTP://www.croplife.com/article/286, May 7, 2009, 1 page.
AgRobotics AutoProbe Demo at CTIC Tour, HTTP://precisionpays.com/?s=auto+probe&x=130&y=10, Aug. 28, 2011, 2 pages.

(Continued)

*Primary Examiner* — Yonel Beaulieu
(74) *Attorney, Agent, or Firm* — Law Office of Mark Brown, LLC; Mark E. Brown

(57) ABSTRACT

A system and method for collecting soil samples is provided that permits a user to develop or generate one or more paths in an agricultural field to collect soil samples with each soil core collection point along the path being identified. The agricultural field can be divided into management zones having similar productivity and each management zone can have a path with the identified collection points to collect samples for that management zone.

20 Claims, 3 Drawing Sheets

OTHER PUBLICATIONS

Precision Soil Sampling, HTTP://precisionpays.com/?s=auto+probe&x=130&y=10, Mar. 7, 2008, 2 pages.

How to Use the Smart Sampling Tool, HTTPS://www.agfleet.com/help/zmizm2_0em, 2 pages.

Joe Russo, Data Management Tools, InfoAg 2007, Jul. 10, 2007, 61 pages.

Erin Abegg, AgFleet: Emerging Technology for Crop Management Solutions, 27 pages.

G. Rains and D. Thomas, Soil-Sampling Issues for Precision Management of Crop Production, The University of Georgia Cooperative Extension, May 2009, 4 pages, Bulletin 1208.

* cited by examiner

SYSTEM AND METHOD FOR COLLECTING SOIL SAMPLES

CROSS-REFERENCE TO RELATED APPLICATIONS

This application claims the benefit of U.S. Provisional Application No. 61/363,416, entitled "SYSTEM AND METHOD FOR COLLECTING SOIL SAMPLES," filed Jul. 12, 2010, which application is hereby incorporated by reference in its entirety.

BACKGROUND

The application generally relates to collecting soil samples. The application relates more specifically to a system and method for determining the probe points and the corresponding path, i.e., a guided sample path and probe point logging system, needed to collect soil samples in an agricultural field.

Currently available agricultural software creates target points for collecting soil samples in an agricultural field using a grid method. FIG. 1 shows a grid dividing an agricultural field into a series of squares or blocks 100. The size of the squares or blocks 100 established by the grid can be selected by a user, but typically the squares or blocks can have a size of about 2.5 acres. Once the grid is established for the agricultural field, target points 102 are established for each grid block 100, typically at the center of the grid block 100. A user will then have to take a soil sample at the corresponding target point 102 for each of the grid blocks 100 to complete the collection of soil samples. Using the grid method requires the user to cover the entire agricultural field regardless of whether all of the areas of the agricultural field require sampling.

To take a soil sample, an individual uses a visual aid to navigate to each target point 102 where enough sample cores 104 are taken in close proximity to the target point 102 to make up one standard soil sample, e.g., 1 pound (lb.) of soil, to be analyzed by a lab. As shown in the enlarged section of FIG. 1, a series of sample cores 104 can be taken in a circular pattern around the target point 102. Currently available systems for managing soil samples only log the coordinate of the target point and not the unique probe points where the actual soil is taken. By using the target points for the location of the soil samples, standard software can use an interpolation scheme to "guess" what the soil results should be between target points.

Therefore, what is needed is a system and method for collecting soil samples that can be adapted to the agricultural field and can identify and/or track the actual location where the soil sample is taken.

SUMMARY

The present application is directed to a method for determining sample points in an agricultural field. The method includes identifying one or more areas in an agricultural field. Each identified area of the agricultural field has a similar productivity. The method further includes determining a path through each identified area of the one or more areas of the agricultural field and calculating a predetermined number of sample points to be taken on each determined path. The method also includes determining a location on a corresponding determined path for each calculated sample point for the corresponding determined path and displaying each identified area of the one or more areas of the agricultural field with the corresponding determined paths and the corresponding locations of the sample points for the corresponding determined paths.

The present application is additionally directed to a system having a computer associated with a piece of equipment, a global positioning system device associated with the piece of equipment and a user interface. The piece of equipment is located in an agricultural field and the global positioning system device is configured to determine the location of the piece of equipment in the agricultural field. The system further has a soil sampling management system. The soil sampling management system includes a first computer algorithm executable by a microprocessor and a second computer algorithm executable by a microprocessor of the computer. The first computer algorithm operates to permit a user to create a map of the agricultural field. The map of the agricultural field includes information on at least one management zone in the agricultural field, at least one path through the at least one management zone and a plurality of sample points on the at least one path. The second computer algorithm operates to receive location information on the piece of equipment from the global positioning system device in response to a collection of a sample and to generate an updated sample point on the map corresponding to the location information from the global positioning system device. The user interface displays the map and the updated sample points.

One advantage of the present application is a reduction in the number of samples that are required to be collected from an agricultural field.

Other advantages of the present application include maximizing return on crop nutrient inputs, reducing fertilizer applications, maximizing yield potentials, and minimizing input costs from a more accurate soil analysis obtained from the collected samples.

Still another advantage of the present application is an easy to use interface that assists with the collection of soil samples.

Other features and advantages of the present application will be apparent from the following more detailed description of the preferred embodiment, taken in conjunction with the accompanying drawings which illustrate, by way of example, the principles of the application.

BRIEF DESCRIPTION OF THE DRAWINGS

Wherever possible, the same reference numbers are used throughout the drawings to refer to the same or like parts.

DETAILED DESCRIPTION OF THE EXEMPLARY EMBODIMENTS

The present application is directed to a software implemented soil sampling management system and method that permits a user to develop or generate one or more paths in an agricultural field to collect soil samples and to identify each soil core collection point coordinate along the path. The system and method can also associate the lab data from the analyzed soil samples to the appropriate core points to do conventional geographic information system (GIS) analysis as well as permit the use of new analysis techniques. In an exemplary embodiment, the soil sampling management system can be used with an agricultural field data system such as the one described in U.S. patent application Ser. No. 13/117,794, entitled "SYSTEM AND METHOD FOR COLLECTING AND PROCESSING AGRICULTURAL FIELD DATA," which patent application is hereby incorporated by reference. However, the soil sampling management system can be used with any suitable type of agricultural field data system.

The soil sampling management system and method can be implemented on a user computer or equipment computer associated with a piece of soil sampling equipment. In another embodiment, the soil sampling management system can be completely or partially implemented on another (remote) computer that is in communication with the user computer or equipment computer. The remote computer can exchange data, information and/or commands with the user computer or equipment computer over the Internet or by any other suitable communication technique or method during the soil sampling process.

Figure 1:
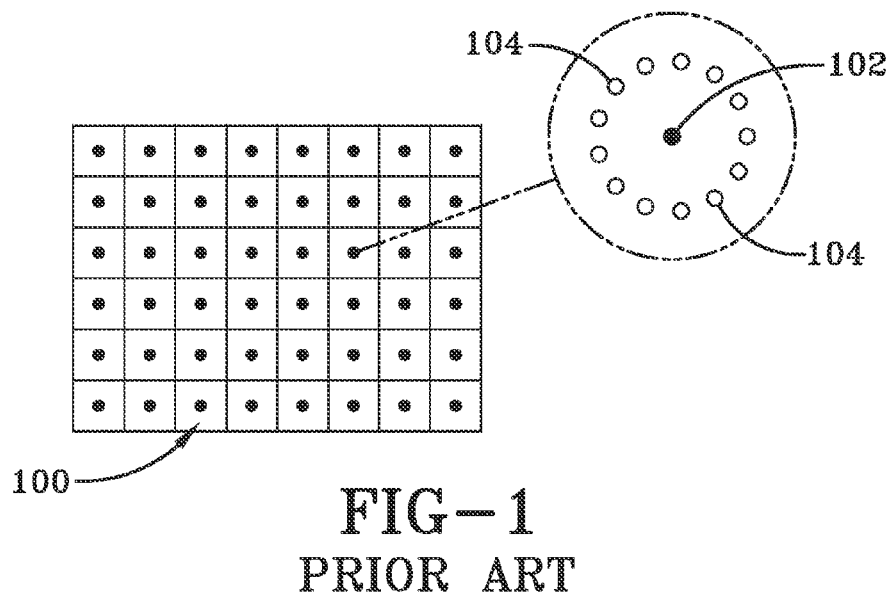
FIG. 1 shows the previous technique for collecting soil samples in an agricultural field.
Figure 2:
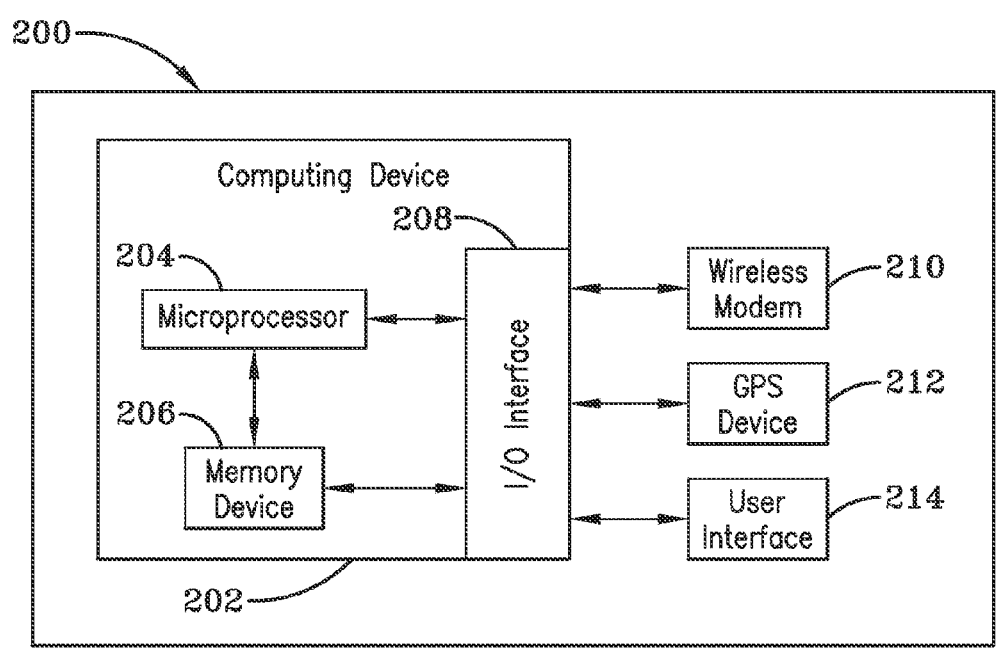
FIG. 2 shows schematically a piece of soil sampling equipment with corresponding components in an exemplary embodiment.

FIG. 2 shows schematically components on a piece of soil sampling equipment. The soil sampling equipment 200 can have a computing device or computer 202 that includes a microprocessor 204, a memory device 206 and an I/O interface 208. The I/O interface 208 can permit communication between the computing device 202 and other components of the soil sampling equipment 200. The soil sampling equipment 200 can also include a wireless modem 210 to permit the soil sampling equipment 200 to communicate over the Internet or by any other suitable communication technique or method. A GPS device 212 can be used to determine the position of the soil sampling equipment 200. The soil sampling equipment 200 can include a user interface 214, such as a monitor, display and/or other associated equipment or software, to enable a user or operator to receive information from and interact with the soil sampling management system.

In one exemplary embodiment, the GPS device 212 can be used in conjunction with auto-steer or auto-guidance functionality incorporated into the soil sampling equipment 200 to control the soil sampling equipment to follow a predetermined path generated by the soil sampling management system. The soil sampling management system can record each probe point position where soil is collected using the GPS device 212 and associate that position to the other probe point positions that were used to make up a sample. In one embodiment, approximately one (1) pound of soil is needed for a suitable soil sample and about eight (8) to ten (10) probe collections may be needed to provide enough soil for a proper sample. In another embodiment, depending on the size of the probe, a suitable or appropriate soil sample may be obtained from only one or two probe collections. Stated differently, the soil sampling management system can log or record the specific probe locations for soil collection that were used in a specific soil sample. In addition, if the actual probe point where the soil is collected by the sampling equipment deviates from the predetermined probe point determined by the soil sampling management system, the computing device 202 can log and record the actual position where the soil probe occurred and provide that information to the soil sampling management system.

In an exemplary embodiment, the soil sampling equipment can be the soil sampling machine described in U.S. patent application Ser. No. 13/168,429, entitled "SOIL SAMPLING MACHINE AND METHOD OF USE," which patent application is hereby incorporated by reference. However, the soil sampling equipment can be any suitable type of equipment for collecting soil samples, including automated equipment (both fully and partially automated) and manually operated equipment.

The soil sampling management system can be used to create a field-specific sampling procedure or guide to collect soil samples. The field-specific sampling procedure includes information on the length of the line or path to be followed, the number of probe points on the path and a sample density, i.e., the number of samples to be taken in an area. The creation of the field-specific sampling procedure uses information on soil type, crop yield history, commodity price, crop impact on environment, and other agronomic assessments.

Figure 3:
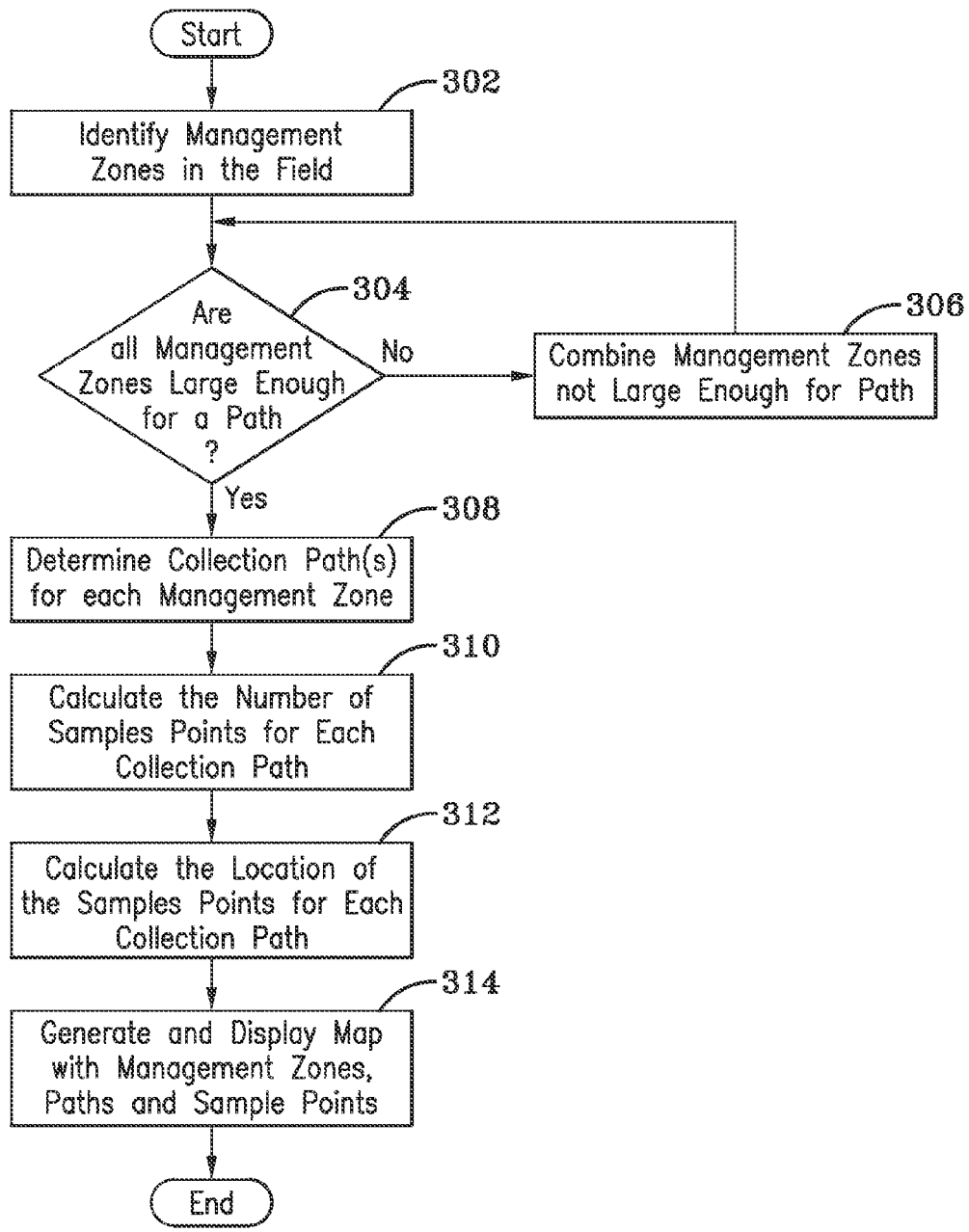
FIG. 3 shows an exemplary embodiment of a process for determining soil sampling paths and sample points for an agricultural field.

FIG. 3 shows one exemplary embodiment for creating sampling paths (with sampling points), i.e., a field specific sampling procedure or guide, for an agricultural field. The generation of the field-specific sampling procedure begins with the identification of one or more management zones in the agricultural field (step 302). In one exemplary embodiment, the management zones can be identified or created using existing data to determine "like" or similar areas of productivity or management. The data that can be used to determine similar areas of productivity includes soil type (as established by governmental agency), and crop yield history (based on crop yield information spanning multiple years). In one exemplary embodiment, the user is permitted to manually adjust the management zones or areas, e.g., drag (weight/bias) the management zones or areas in any direction, based on the user's knowledge of the field to be sampled.

A determination is then made as to whether all of the management zones are of an appropriate or predetermined size (step 304). In an exemplary embodiment, a management zone is not the appropriate size if the management zone or area is not large enough for the generation of a path, e.g., the size of the management zone or area is smaller than a predetermined minimum area or size such that a path with several sample points cannot be generated. In one exemplary embodiment, the predetermined minimum zone area can be approximately 1 acre. In another exemplary embodiment, the predetermined minimum zone area can be dependent on the type and value of crop located (or to be located) in the area. For example, a vineyard would have a predetermined minimum area less than 1 acre and dryland soybeans would have a predetermined minimum area greater than 1 acre.

If all of the management zones are not the appropriate or predetermined size, then the management zones that are not the appropriate size, i.e., the "small" management zones, are combined, with other "small" management zones and/or with management zones that are of the appropriate size (step 306). Once the "small" management zones are combined, the process returns to step 304 to determine if the updated management zones are all of the appropriate or predetermined size. In another exemplary embodiment, the smaller management areas or zones may be disregarded and removed from consideration, i.e., no path or sample points will be generated for that management zone or area, if there are a sufficient number of appropriately sized management zones that can provide an adequate number of soil samples for the field.

After determining that all of the management zones or areas are of the appropriate size, either through the combination or removal of management zones, a predetermined path is calculated through each of the management areas or zones (step 308) to collect samples from that management zone or area. Some exemplary factors used in the determination of the path are the total size or area of the management zone, the length or width of the management zone, the topography (elevation) of the management zone, machine traffic lanes in the management zone, crop row direction, prevailing wind direction, and water management structures (irrigation or drainage passageways). In one exemplary embodiment, the path can be initially calculated by centering it in the management zone, and then accounting for the other factors discussed above which can adjust the location of the path. In addition, the path cannot have an arc or turn that is outside of the capabilities of the soil sampling equipment, i.e., the path cannot have any turns that are less than the turning radius of the soil sampling equipment.

In one embodiment, if the management area or zone is a larger zone, e.g., a zone having a width greater than 1500 feet, then several predetermined paths through the management area or zone can be calculated, i.e., paths having a defined beginning and end, to collect the samples, or a single continuous or uninterrupted path having multiple passes or following a tortuous route through the management area or zone can be calculated. In one exemplary embodiment, the user is permitted to manually adjust the placement of the path, e.g., drag (weight/bias) the path in any direction, based on the user's knowledge of the field to be sampled.

Once the path through the zone is determined, the number of samples to be collected can be calculated (step 310). In an exemplary embodiment, the length of the line or path and type of management zone (e.g., low yield potential=fewer samples; high yield potential=more samples) can be used to determine how many samples are collected. In another exemplary embodiment, the user can determine the number of samples to be collected for a particular zone. The user determination of the number of samples to be collected can be based on the calculated number of samples and the user can add or remove samples as required. Alternatively, the user may determine the number of samples based on the user's experience and knowledge without regard to the calculated number of samples. Once the length of the path and the number of samples to be collected are determined, the system can then determine the specific probe points along the path (step 312). In one embodiment, the probe points can be evenly spaced along the path. In another exemplary embodiment, the user can adjust the position of the probe points along the path based on the user's knowledge of the agricultural field. After the specific probe points are calculated or determined, a map can be generated and displayed for the user with information on the management zones, the paths through the management zones and the sample points along the paths.

Figure 4:
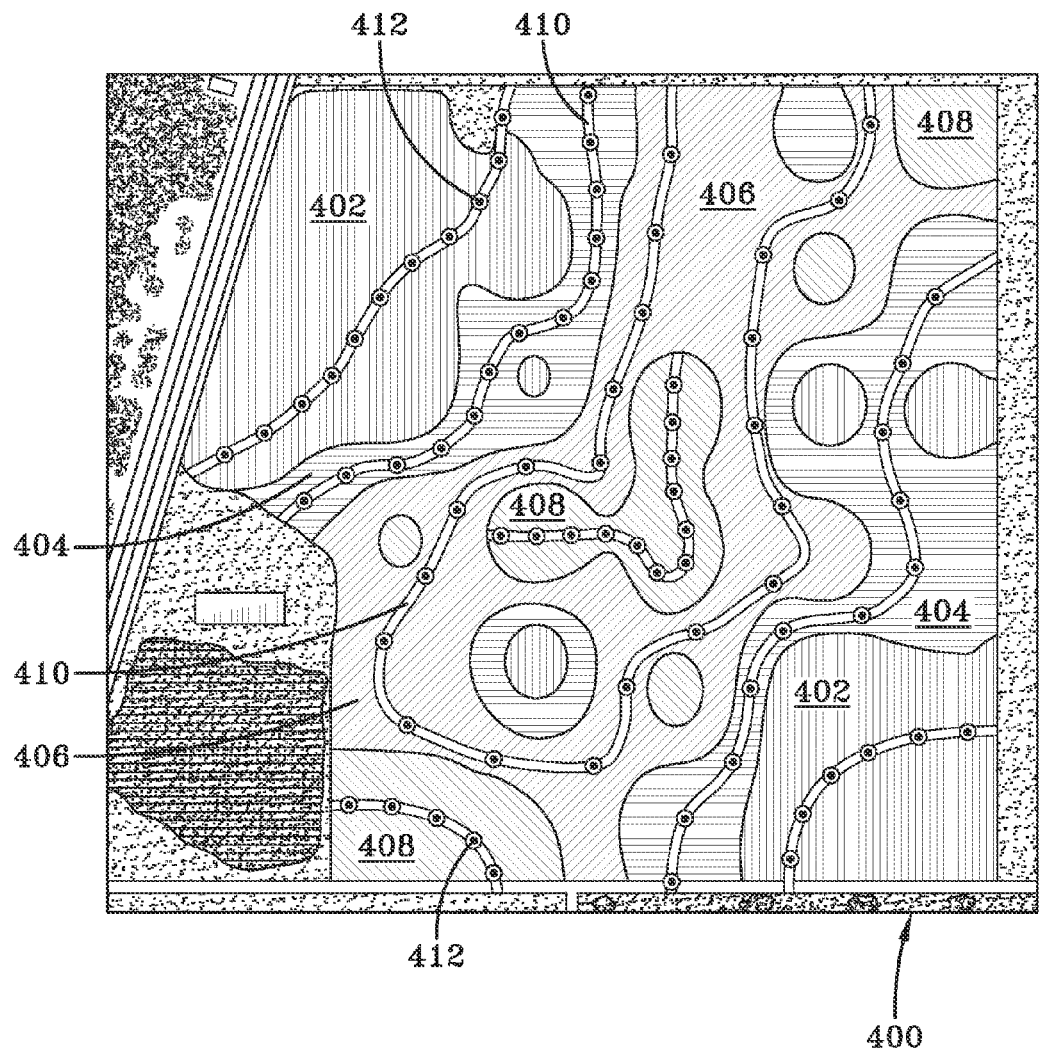
FIG. 4 shows an exemplary embodiment of a map generated by the process of FIG. 3.

FIG. 4 shows an exemplary embodiment of a map generated by the soil sampling management system. The map 400 can include four different management zones or areas. The management zones or areas include a low yield area 402, medium-low yield area 404, medium-high yield area 406 and high yield area 408. For each of the management zones or areas of an appropriate size for the taking of soil samples, a path 410 with corresponding sample points 412 are displayed. In one embodiment, the map 400 can be provided as an overlay to a satellite map or other type of map of the agricultural field.

In one exemplary embodiment, the soil sampling management system can generate a map and coordinate points for an agricultural field that can be printed out for the manual collection of soil samples. After the samples have been manually collected, the soil sampling management system would have to be updated by the user with the information from the collection process, e.g., the corresponding GPS position of the sample.

The present application contemplates methods, systems and program products on any machine-readable media for accomplishing its operations. The embodiments of the present application may be implemented using an existing computer processor, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the systems chosen and on designer choice. All such variations are within the scope of the application. Likewise, software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims. It should also be understood that the phraseology and terminology employed herein is for the purpose of description only and should not be regarded as limiting.

It is important to note that the construction and arrangement of the present application as shown in the various exemplary embodiments is illustrative only. Only certain features and embodiments of the invention have been shown and described in the application and many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A computer implemented method for determining sample points in an agricultural field, the method comprising:
    identifying one or more areas in an agricultural field, each identified area of the agricultural field having similar productivity;
    determining a path through each identified area of the one or more areas of the agricultural field;
    calculating a predetermined number of sample points to be taken on each determined path;
    determining a location on a corresponding determined path for each calculated sample point for the corresponding determined path; and
    displaying on a display each identified area of the one or more areas of the agricultural field with the corresponding determined paths and the corresponding locations of the sample points for the corresponding determined paths.

2. The method of claim 1 wherein identifying one or more areas in an agricultural field includes determining whether an identified area has a predetermined size.

3. The method of claim 2 wherein determining whether an identified area has a predetermined size includes determining whether a size of the identified area is greater than a predetermined minimum size.

4. The method of claim 3 wherein the predetermined minimum size is 1 acre.

5. The method of claim 3 wherein identifying one or more areas in an agricultural field includes combining identified areas that are less than the predetermined minimum size.

6. The method of claim 3 wherein identifying one or more areas in an agricultural field includes disregarding identified areas that are less than the predetermined minimum size.

7. The method of claim 2 wherein the predetermined size for an identified area is based on a type of crop associated with the identified area.

8. The method of claim 1 wherein determining a path through each identified area includes determining the path through the identified area based on at least one of a total size of the identified area, a length of the identified area, a width of the identified area, a topography of the identified area, machine traffic lanes in the identified area, crop row direction in the identified area, prevailing wind direction for the identified area or water management structures in the identified area.

9. The method of claim 1 wherein determining a path through each identified area includes centering the path through the identified area.

10. The method of claim 1 wherein determining a path through each identified area includes determining a plurality of paths through the identified area.

11. The method of claim 1 wherein the determined path includes a plurality of passes through the identified area.

12. The method of claim 1 wherein calculating a predetermined number of sample points includes calculating the predetermined number of sample points based on a length of the determined path and a type of productivity for the identified area.

13. The method of claim 1 wherein determining a location on a corresponding determined path for each calculated sample point includes evenly spacing the calculated sample points on the corresponding determined path.

14. The method of claim 1 further comprising enabling a user to adjust at least one of the one or more identified areas, the corresponding determined paths in the one or more identified areas or the corresponding locations of the sample points on the determined paths.

15. The method of claim 1 further comprising determining similar productivity for each identified area base on a soil type of the identified area and a crop yield history for the identified area.

16. A system comprising:
    a computer associated with a piece of equipment, the piece of equipment being located in an agricultural field;
    a global positioning system device associated with the piece of equipment; the global positioning system device being configured to determine the location of the piece of equipment in the agricultural field;
    a soil sampling management system comprising:
        a first computer algorithm executable by a microprocessor, the first computer algorithm operates to permit a user to create a map of the agricultural field, the map of the agricultural field including information on at least one management zone in the agricultural field, at least one path through the at least one management zone and a plurality of sample points on the at least one path; and
        a second computer algorithm executable by a microprocessor of the computer, the second computer algorithm operates to receive location information on the piece of equipment from the global positioning system device in response to a collection of a sample and to generate an updated sample point on the map corresponding to the location information from the global positioning system device; and
    a user interface to display the map and the updated sample points.

17. The system of claim 16 wherein the first computer algorithm operates to permit a user to adjust the position of at least one of the at least one management zone, the at least one path or the plurality of sample points on the map using the user interface.

18. The system of claim 16 wherein the at least one management zone comprises a plurality of management zones, each management zone of the plurality of management zones having a similar productivity.

19. The system of claim 18 wherein the at least one path comprises a plurality of paths, each path of the plurality of paths corresponds to a management zone of the plurality of management zones.

20. The system of claim 19 wherein each path of the plurality of paths has a plurality of sample points, the plurality of sample points being evenly spaced on a corresponding path of the plurality of paths.

* * * * *